Jan. 12, 1932.   R. MARSHALL ET AL   1,841,141
STALL PARTITION
Filed April 14, 1928
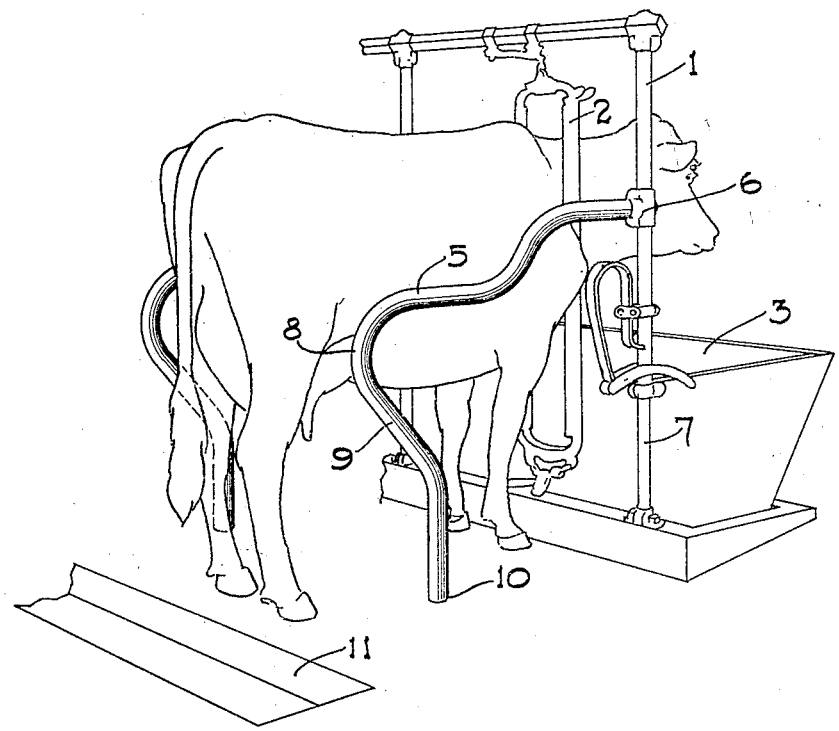
INVENTOR.
Roy Marshall and
John B. Olson
BY Erwin, Wheeler & Woolard
ATTORNEYS.

Patented Jan. 12, 1932

1,841,141

UNITED STATES PATENT OFFICE

ROY MARSHALL AND JOHN B. OLSON, OF FORT ATKINSON, WISCONSIN, ASSIGNORS TO JAMES MANUFACTURING COMPANY, OF FORT ATKINSON, WISCONSIN

STALL PARTITION

Application filed April 14, 1928. Serial No. 269,954.

This invention relates to improvements in stall partitions.

The length of a skeleton or bar portion for cow stalls of the type now in general use is necessarily fixed within fairly restricted limits and so likewise is the height at the rear. If the partition is too high or too long the cow will work her way beneath it. If it is too short or too low, the cow will straddle it and tend to cause great injury to herself and possibly to a neighboring animal.

The partition bar as heretofore constituted, has run vertically downwardly into the concrete or other floor of the stall from its rearmost point. When the animal lies down it is rather closely confined between stall partitions in the average installation due to the fact that the relatively non-yieldable portion of the animal's leg below the hock abuts the vertical stall partition post on one side thereby forcing the animal's body against the vertical post on the other. This has been credited with killing unborn calves due to the pressure between the cow's ribs of the stall partition bar against which the cow is forced and which has heretofore been so made as to be substantially parallel with the cow's ribs.

The vertical rear portion of stall partitions as heretofore made has been subject to rapid corrosion induced by spatter from the gutter and facilitated by the abrasion of the animal's feet. The animals remove the paint near the floor level by kicking at the post because of its proximity. The point at which the bar enters the concrete is necessarily very close to the gutter when it is directly below the rearmost part of the partition. Various attempts have been made to protect the partition bars from acid corrosion by coating them with asphaltum or non-corrosive platings and also by positioning tubular shields about them in which the partition post is enclosed for a portion of its height.

The present invention deals differently with these problems. It is the purpose of the present invention to promote the comfort, safety and sanitation of the animals by curving the partition bar forwardly from its rearmost point to enter the floor between the front and rear of the stall. The direction taken by the forwardly inclined portion of the partition bar is such that it will extend transversely of the animal's ribs and can not possibly be pressed therebetween in the reclining position of the animal. The preferred point of entry into the floor is approximately midway between the gutter and the stanchion and gives adequate strength to the assembly while substantially wholly removing the partition from the zone in which spattering occurs. And finally it is an object of the invention to facilitate tremendously the cleaning of the stalls by leaving the entire rear half of a row of stalls unimpeded and open so that refuse may readily be swept or scraped from and through them all with no tendency to catch at the partition as has heretofore been the case.

The drawing shows in perspective a stall having a partition embodying this invention.

The head frame indicated generally at 1 may be of any desired construction and may be supplied with a stanchion 2 and manger 3.

This invention relates wholly to the stall partition 5 which is connected at 6 with the vertical post 7 of frame 1 by a clamp or otherwise, and extends rearwardly to a point at 8 which is approximately laterally adjacent the leg of the animal. The form of that portion of the partition bar between its rear end 8 and its connection with post 7 at 6 is immaterial. Many well recognized and more or less distinctive shapes of stall partition bars are available on the market and this invention is applicable to each.

In accordance with this invention the bar 5 is carried forwardly at 9 to the floor at 10. It is preferably anchored by being embedded in the masonry of the floor although any desired anchorage will be acceptable. It will be noted that the point of anchorage is very materially in advance of the rear end 8 of the partition, being approximately midway between the gutter 11 and the head frame 1. This position is preferred for several reasons as follows:

In the first place, the anchorage at 10 is sufficiently far forward so that it no longer is engaged by the lower leg of a reclining animal. Thus far more freedom of movement is permitted the occupant of the stall and pressure between the stall partitions is largely eliminated while the animal can more easily lie down and arise than heretofore. Secondly, the anchorage is out of the normal range of kicks from the animal's hoofs so that the enamel or other protective finish is more apt to endure. Thirdly, the entire partition bar is substantially completely out of the zone of spattering from the gutter and consequently is safe from corrosion without special and expensive protection. Fourthly, the portion of a stall in which fecal matter accumulates is left entirely unobstructed so that a shovel, scraper, and broom may be used with great convenience. Fifthly, there is space provided for the legs of a milk stool without interference. Sixth, there is sufficient angle for the inclined portion 9 of the partition bar to ensure against pressure between the ribs of an animal heavy with young. Seventh, and finally, the anchorage is not too far forward to provide adequate resistance to the powerful torque exerted by a cow in swinging against the partition at its overhanging rear end 8.

These advantages, obtained without varying the length or height of the partition and at negligible expense, fully satisfy the objects specified for this invention. It will be apparent to those skilled in the art that a partition may be made in many forms within the present invention while presenting the numerous advantages residing in the rearwardly overhanging rear end and intermediate anchorage herein described.

We claim:

1. In a stall for cattle, a stall partition bar to be attached to a stanchion frame in a position extending rearwardly therefrom to approximately the length of a cow from shoulder to flank and having a downwardly and forwardly extending supporting portion located at a substantial distance above the floor and provided with a post-like extremity adapted to be anchored to the floor substantially midway of the length of the side of the stall.

2. In a stall for cattle, a one piece partition comprising a bar having a floor engaging portion at one end and means for engaging a stanchion frame at the other end, the intermediate portions of the bar comprising a partition top member, and a generally arcuate flank guard extending rearwardly from the space above the floor engaging portion between such portion and the top member, said floor engaging portion being positioned for engagement with the middle portion of the stall floor.

JOHN B. OLSON.
ROY MARSHALL.